Patented Aug. 16, 1927.

1,639,584

UNITED STATES PATENT OFFICE.

WILLIAM ARTHUR BONE, OF ST. ALBANS, ENGLAND.

PRODUCTION OF ACTIVATED NITROGEN AND OF OXIDES OF NITROGEN THEREFROM.

No Drawing. Application filed February 19, 1924, Serial No. 693,918, and in Great Britain February 28, 1923.

I have discovered that when a mixture of carbon monoxide and oxygen is exploded under compression in the presence of nitrogen, not only is the combustion of the carbon monoxide delayed and extended in time as compared with the combustion when nitrogen is not present, but also a part of the energy developed on combustion is absorbed by the nitrogen which is thereby made chemically active and may be kept in such "activated" condition for a time sufficiently long to permit it to combine with other matter. I have also discovered that the presence of hydrogen in an explosive mixture of carbon monoxide and oxygen containing nitrogen, counteracts and hinders or diminishes the said activation of the nitrogen.

My invention is based on the foregoing discoveries and consists broadly in activating nitrogen by exposing it to the energy developed by the explosion of a mixture of carbon monoxide and oxygen under high initial compression.

The invention also consists in activating the nitrogen present in a suitably proportioned mixture of carbon monoxide, oxygen and nitrogen by exploding the mixture under high initial compression in a closed chamber.

The activated nitrogen produced is useful on account of the readiness with which it combines with certain other substances to make useful products.

In accordance with the invention a mixture of carbon monoxide, oxygen and nitrogen in suitable proportions is exploded in a closed chamber under high initial compression in such a manner that during or immediately after the explosion the nitrogen present is in contact with the element or substance with which it is to combine or react. Thus in some cases the said element or substance may be present in the chamber from the first while in others it may be introduced into the chamber by any suitable means after the explosion. It must be borne in mind that the duration of the activity of the activated nitrogen is brief; for instance, I find that when a mixture of 2 vols. of carbon monoxide, 1 vol. of oxygen and 6 vols. of nitrogen is exploded in a closed vessel of 250 c. c. capacity, under an initial pressure of 50 atmospheres, the activated condition induced in the nitrogen practically ceased after about 1½ seconds after the ignition.

It should be understood that in general the best proportion of carbon monoxide to oxygen in the mixture is that theoretically necessary for realizing the equation $2CO+O_2=2CO_2$. Deviation from this proportion is permissible if regard is had to the nature of any chemical reaction in which the activated nitrogen is to take part, when an excess of carbon monoxide or oxygen may be desirable or of no importance.

With regard to the degree of initial pressure required, while it is possible, on exploding a mixture of carbon monoxide and air in correct theoretical proportion for complete combustion of the carbon monoxide, to detect activation of the nitrogen when the initial pressure of the mixture before explosion is 10 atmospheres, no useful effect is attained until the initial compression used is as much as 30 atmospheres, and for practical purposes 50 atmospheres are to be preferred; so far as present knowledge is concerned, however, no upper limit to the useful initial pressure can be given, since the activation is greater at 75 atmospheres than at 50 and still greater at 100.

The invention, therefore, embraces all initial pressures above 30 atmospheres, and this is an important part of the invention; for the main effect in regard to the activation of the nitrogen seems to be due to the absorption by the nitrogen of the peculiar radiation emitted when carbon monoxide combines with oxygen in suitable circumstances.

With reference to the freedom of the gaseous mixture from hydrogen, free or combined, it may be said that while the best results are attainable when this element is wholly absent and practically no result is attainable when the carbon monoxide is mixed with hydrogen in proportion at all approaching that in water gas or town gas, the presence of one or two per cent of hydrogen does not prevent useful activation of the nitrogen, so that industrial gases containing small proportions of hydrogen, such as blast furnace gas having this qualification, preferably freed from carbon dioxide, are available for the invention.

The invention may be illustrated by describing the manufacture of oxides of nitrogen in accordance therewith, in which respect the invention has the advantage over known methods involving explosion in that it gives a better yield.

A mixture of 2 vols. of carbon monoxide, two vols. of nitrogen and three vols. of oxygen compressed to a pressure of 75 atmospheres is exploded in a bomb having a suitable inlet valve or valves and release valve, as well as an ignition device, and adapted to withstand the maximum pressure developed on explosion. Any other suitable closed chamber may serve; for instance when it is required to convert some of the energy of the explosion into power, the chamber may be the cylinder of an appropriately constructed internal combustion engine. Immediately after the explosion the release valve opens, or is opened, and the escaping gases which become cooled by expansion are treated by any known method for recovering oxides of nitrogen from gases.

Regard should be had to the dimensions of the bomb or exploding chamber; this should have a ratio of volume to surface as large as possible and preferably exceeding 2.5:1, so that during the explosion the reacting gases may be cooled by the walls as little as possible.

It must be remembered that for the activation of the nitrogen the presence of hydrogen is injurious and in order that the yield of nitric oxide may be a maximum, combustion of the carbon monoxide must be complete on explosion and additional oxygen must be present for combination with the activated nitrogen. This necessitates the use of an excess of oxygen. Also for obtaining the best yield of nitric oxide, rapid cooling of the products after the explosion is desirable.

Having thus described the nature of the said invention and the best means I know of carrying the same into practical effect, I claim:—

1. A method of activating nitrogen which consists in exposing it directly to the energy developed by the explosion of a mixture of carbon monoxide and oxygen under an initial pressure of at least 30 atmospheres.

2. A process of activating nitrogen which consists in making an explosive mixture of carbon monoxide, oxygen and nitrogen and exploding it at an initial pressure of at least 30 atmospheres.

3. A process of activating nitrogen which consists in making an explosive mixture of nitrogen, 2 vols. of carbon monoxide and 1 vol. of oxygen, and exploding it an initial pressure of at least 30 atmospheres.

4. A process of making oxides of nitrogen which consists in making an explosive mixture comprising carbon monoxide, nitrogen and oxygen in excess of that required to burn the carbon monoxide, and exploding it at an initial pressure of at least 30 atmospheres, then rapidly cooling the exploded gases, and recovering therefrom the oxides of nitrogen.

5. A process of making oxides of nitrogen which consists in making a mixture of nitrogen, carbon monoxide, and oxygen in proportion sufficient to burn completely the carbon monoxide, exploding the mixture at an initial pressure of at least 30 atmospheres and after explosion intermixing the products of it with oxygen while the activated condition of the nitrogen persists, and rapidly reducing the temperature.

6. A process of making oxides of nitrogen, which consists in making an explosive mixture comprising carbon monoxide, nitrogen and oxygen in excess of that required to burn the carbon monoxide, and exploding it at an initial pressure of at least 75 atmospheres, then rapidly cooling the exploded gases, and recovering therefrom the oxides of nitrogen.

7. A process of making oxides of nitrogen, which consists in making a mixture of carbon monoxide, oxygen, in proportion sufficient to burn completely the carbon monoxide, and nitrogen, exploding the mixture at an initial pressure of at least 75 atmospheres, and after explosion intermixing the products of it with oxygen while the activated condition of the nitrogen persists, and rapidly reducing the temperature.

8. A process of making oxides of nitrogen, which consists in producing an explosive mixture comprising carbon monoxide, nitrogen and oxygen in excess of that required to burn the carbon monoxide, said explosive mixture containing not more than about 2 per cent of hydrogen, and exploding this mixture at an initial pressure of at least thirty atmospheres, then rapidly cooling the exploded gases and recovering therefrom the oxides of nitrogen.

9. A process of making oxides of nitrogen, which consists in producing an explosive mixture comprising carbon monoxide, nitrogen and oxygen in excess of that required to burn the carbon monoxide, said explosive mixture containing not more than about 2 per cent of hydrogen, and exploding the mixture at an initial pressure of at least seventy-five atmospheres, then rapidly cooling the exploded gases and recovering therefrom the oxides of nitrogen.

In testimony whereof I have signed my name to this specification.

WILLIAM ARTHUR BONE.